United States Patent [19]

Park

[11] Patent Number: 5,072,299
[45] Date of Patent: Dec. 10, 1991

[54] SHARPNESS UP/DOWN CIRCUIT FOR VCR CONTROLLED BY A REMOTE CONTROLLER AND CONTROL METHOD THEREOF

[75] Inventor: Je Moon Park, Kyungki-Do, Rep. of Korea

[73] Assignee: Goldstar Co., Ltd., Seoul, Rep. of Korea

[21] Appl. No.: 544,236

[22] Filed: Jun. 26, 1990

[30] Foreign Application Priority Data

Jun. 26, 1989 [KR] Rep. of Korea ................ 8809/1989

[51] Int. Cl.$^5$ .............................................. H04N 5/57
[52] U.S. Cl. ................... 358/169; 358/194.1; 358/188; 358/168
[58] Field of Search ............... 358/169, 168, 160, 166, 358/194.1, 37, 22, 13, 188; 340/793, 767, 706; 455/603

[56] References Cited

U.S. PATENT DOCUMENTS 4,626,848 12/1986 Ehlers ............................ 358/194.1
4,626,892 12/1986 Nortrup .......................... 358/188
4,907,082 3/1990 Richards ......................... 358/188

Primary Examiner—Howard W. Britton
Assistant Examiner—Sherrie Hsia

[57] ABSTRACT

A VCR sharpness up/down circuit controlled by a remote controller for allowing a remote control of VCR sharpness properly by pressing a sharpness-up key or a sharpness-down key on the remote controller with the construction of a sharpness driving unit and a screen control unit and control method thereof by receiving sharpness up/down key signals from the remote controller, counting the number of input up/down key signals, selecting and outputting PWM signals from a PWM data storage unit according to the counted number, converting the output PWM signals through switching operations to a sharpness driving control voltage which is a certain DC voltage, and applying a driving control voltage to an integrator which emphasizes a video signal.

4 Claims, 3 Drawing Sheets

FIG. 3
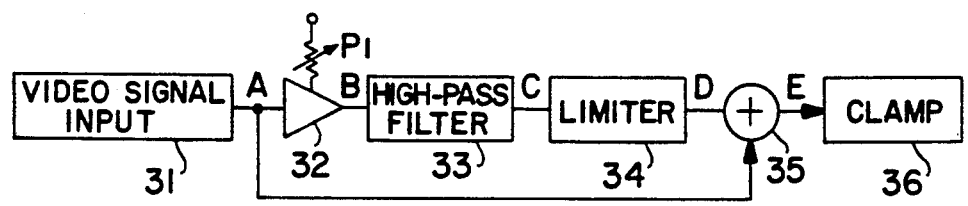

FIG. 5
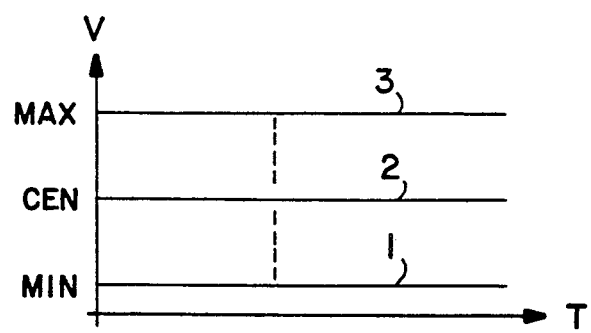
FIG. 6A  FIG. 6B  FIG. 6C
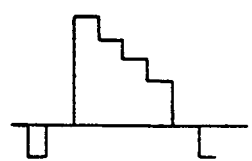 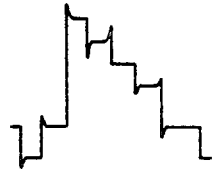 
FIG. 6D  FIG. 6E
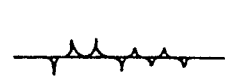 

SHARPNESS UP/DOWN CIRCUIT FOR VCR CONTROLLED BY A REMOTE CONTROLLER AND CONTROL METHOD THEREOF

BACKGROUND OF THE PRESENT INVENTION

1. Field of the Invention

The present invention relates to a sharpness control circuit for a video cassette tape recorder (hereinafter "VCR"), and more particularly, to a sharpness up/down circuit controlled by a remote controller and a control method thereof for enabling the remote control of the sharpness of a picture generated by a VCR possible by manipulating a remote controller.

2. Description of the Prior Art

For various types of conventional video cassette tape recorders, the sharpness is controlled by manually manipulating a variable sharpness key or input mounted on a keyboard and the VCR remote control of a VCR by remote controller is not utilized. Therefore, there is a drawback in that a user has to manipulate the variable sharpness directly and manually for sharpness control on the playback of VCR.

SUMMARY OF THE PRESENT INVENTION

Accordingly, it is an object of the present invention to provide a VCR sharpness up/down circuit and a control method thereof for allowing remote control of sharpness of the VCR properly to be attainable by pressing a sharpness-up key or a sharpness-down key on a remote controller.

Another object of the present invention is to provide an improved sharpness control circuit which includes receiving sharpness up/down key signals from a remote controller, counting the number of input up/down key signals, selecting and outputting pulse width modulation (hereinafter "PWM") signals from the PWM data storage device according to the counted number, converting the output PWM signals through switching operations to a sharpness driving control voltage which is a constant direct current voltage, and applying a driving control voltage to an integrator emphasizes a video signal.

Other objects and further scope of applicability of the present invention will become apparent from the detailed description given below. It should be understood, however, that the detailed description and specific examples, while indicating preferred embodiments of the present invention, are given by way of illustration only, since various changes and modifications within the spirit and scope of the present invention will become apparent to those skilled in the art from this detailed description.

Briefly described, the present invention relates to a VCR sharpness up/down circuit controlled by a remote controller for allowing remote control of the sharpness of a VCR properly by pressing a sharpness-up key or a sharpness-down key on the remote controller through a sharpness driving unit and a screen control unit and control method thereof by receiving sharpness up/down key signals from the remote controller, counting the number of input up/down key signals, selecting and outputting PWM signals from a PWM data storage unit according to the counted number, converting the output PWM signals through switching operations to a sharpness driving control voltage which is a certain DC voltage, and applying a driving control voltage to an integrator which emphasizes a video signal.

BRIEF DESCRIPTION OF THE DRAWINGS

The present invention will become more fully understood from the detailed description given below and the accompanying drawings which are given by way of illustration only, and thus are not limitative of the present invention, and wherein:

FIG. 3 is a detailed block diagram for a screen control unit of FIG. 1;

FIG. 5 shows characteristics of sharpness output voltage according to pulse width modulation signal of FIG. 4;

FIGS. 6A through 6E show waveforms from each part of FIG. 3; and

DESCRIPTION OF THE PREFERRED EMBODIMENTS

Figure 1:
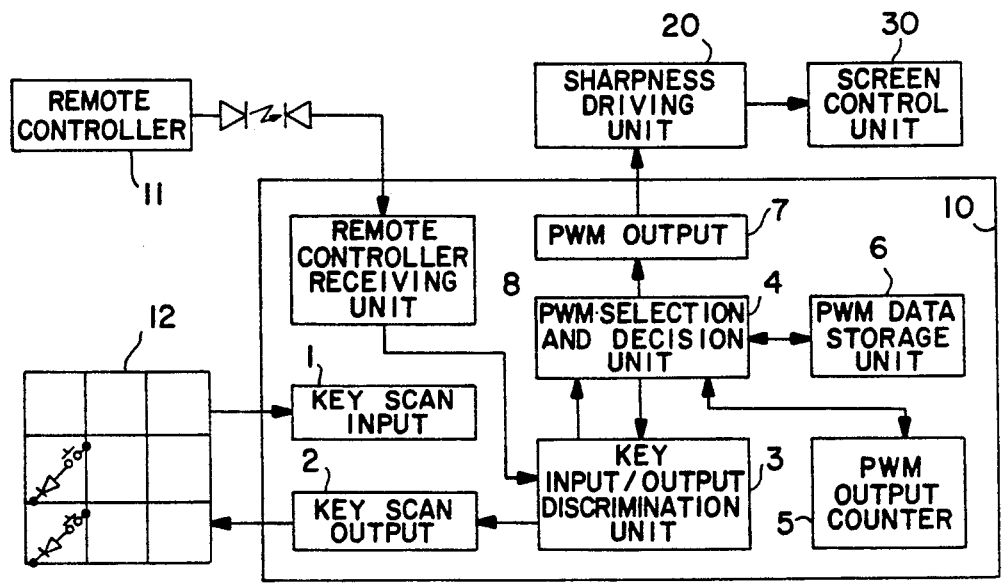
FIG. 1 is a block diagram showing the sharpness up/down circuit controlled by a remote controller according to the present invention.
Figure 2:
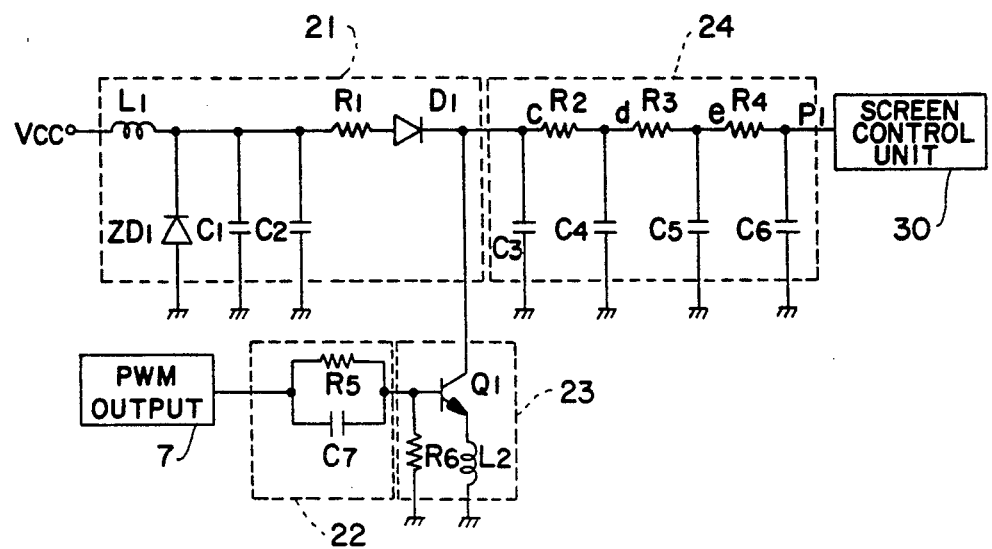
FIG. 2 is detailed circuit diagram showing a sharpness driving unit of FIG. 1.

Referring now in detail to the drawings for the purpose of illustrating preferred embodiments of the present invention, the sharpness control circuit for a VCR as shown in FIGS. 1, 2 and 3, includes a remote controller 11 for generating remote control signals such as sharpness up/down key signals or the like, a key matrix 12 for selecting various function keys, a microcomputer 10 selecting and outputting a corresponding PWM signal when the sharpness up/down key signal input exists after checking a key selection status with a scan of the key matrix 12 as well as a reception of the remote control signal from the remote controller 11, a sharpness driving member 20 for converting the PWM signal outputted from the microcomputer 10 to a DC voltage and outputs it as a sharpness driving voltage, and a screen control member 30 favoring the screen sharpness according to a magnitude of the sharpness driving voltage outputted from the sharpness driving member 20.

The microcomputer 10 includes a key scan input member 1 and a key scan output member 2 that scan the key matrix 12, a remote control receiving member 8 for receiving the remote control signal of the remote controller 11, a key input/output discrimination member 3 for discriminating a key signal input to said key scan input member 1 and a key signal of a remote control signal received at the remote control receiving member 8, a PWM selection/decision member 4 for selecting and outputting PWM data from a PWM data storage member 6 according to the counted number of PWM output counter member 5 with a sharpness up/down key discrimination signal of the key input/output discrimination 3, a PWM output member 7 for outputting a PWM signal according to the PWM data outputted from the PWM selection/decision member 4.

As shown in FIG. 2, the sharpness driving member 20 includes a power supply member 21 supplying through ripple eliminating capacitors C1 and C2, a resistor R1 and a diode D1 a rated DC power drawn out by a zener diode ZD1 after power from a power terminal Vcc passes through a coil L1, a PWM input surge elimination member 22 for eliminating a surge phenomenon with the output PWM signal from the PWM output member 7 passed through a resistor R5 and a capacitor C7, a switching member 23 for performing a switching control of an output of the power supply member 21 with a control of a transistor Q1 driving by a PWM signal through the PWM input surge elimination member 22 wherein a bias resistor R6 and a high frequency elimination coil L2 are connected to the base and the collector of the transistor Q1, respectively, and an integrator 24 for outputting as a sharpness driving voltage the output of the power supply means 21 on which a third integration is performed through capacitors C3-C6 and resistors R2-R4 in a parallel connection.

As shown in FIG. 3, a screen control member 30 includes an emphasis integrator 32 for performing a variable emphasis on high frequency components of video signals outputted from the video signal input means 31 according to the sharpness driving voltage outputted from the sharpness driving member 20, a high-pass filter 33 for allowing only high frequency signals to pass therethrough among the output signals of the integrator 33, a limiter 34 for limiting the amplitude of the signals outputted from the high-pass filter 33, a mixer for mixing the output signals of the limiter 34 with the output signals of the video signal input means 31, and a clamp member 36 for setting the output signals level of the mixer 35 to a certain level.

Figure 7:
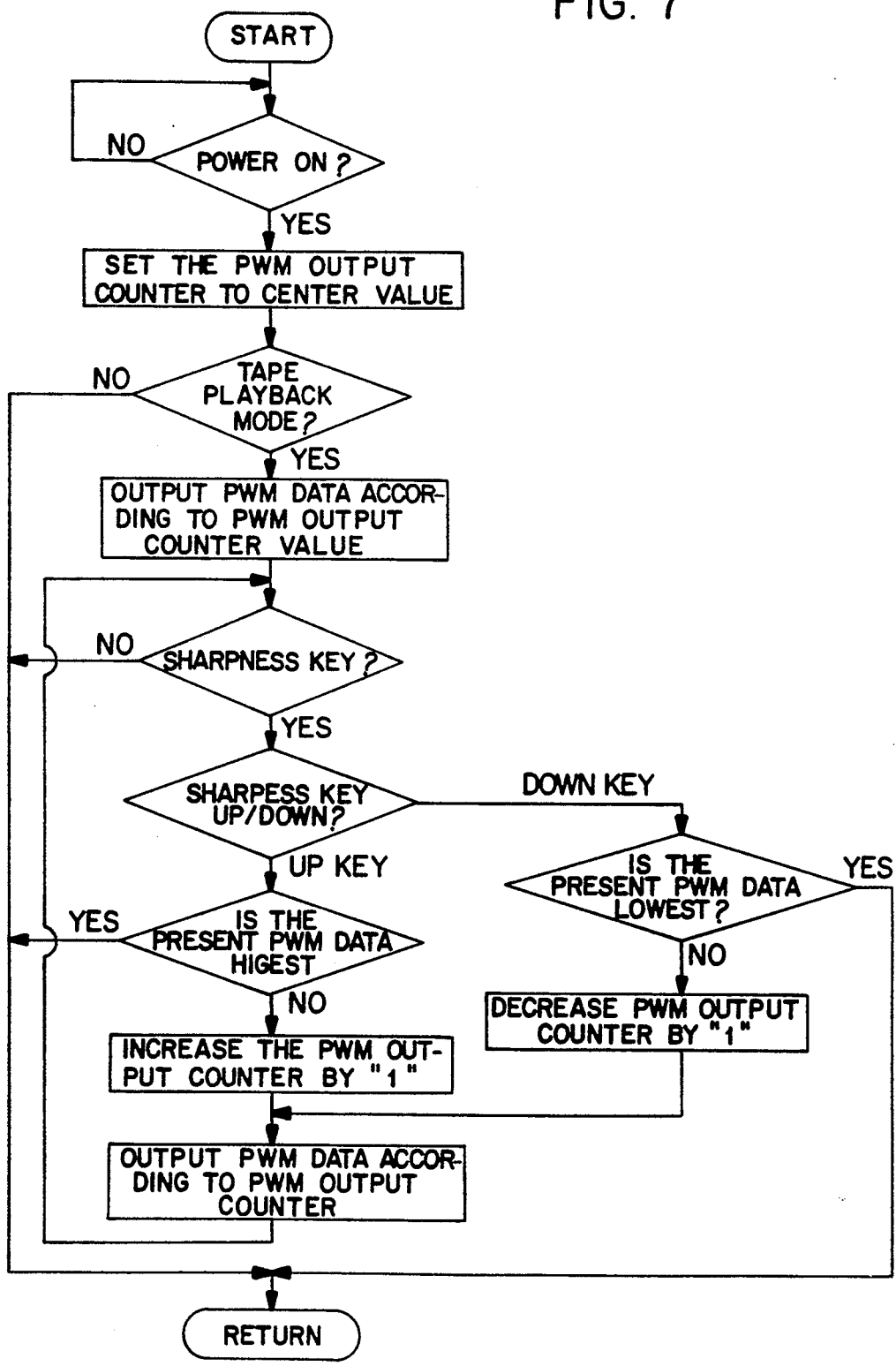
FIG. 7 is a flowchart of sharpness up/down circuit controlled by a remote controller according to the present invention.

The sharpness control circuit according to the present invention operates as follows:

First of all, as shown in FIG. 7, a count value of the PWM output counter member 5 becomes a sharpness center count value at the PWM selection/decision member 4 when power is supplied by the power key.

Thereafter, when in the tape playback mode, an address of the PWM data storage member 6 is selected by the count value of the PWM output counter member 5. That is, by the medium count value, the PWM data stored at the location of the address are read by the PWM selection/decision member 4 and outputted through the PWM output member 7. In such a state, when the sharpness key signal is inputted to the key input/output discrimination member 3 through key scan input member 1 of the remote control receiving member 8, it is determined whether the sharpness key signal is a down key signal or an up key signal. At this time, in case the sharpness down key signal exists, the count value of the PWM output counter member 5 decreases by "1" at the PWM selection/decision member 4, and the address of the PWM data storage member 6 is selected by the count value of the PWM output counter member 5. And then the PWM data stored at the location of the address are read by the PWM selection/decision member 4 and outputted through the PWM output member 7.

When the sharpness-up key signal exists, the count value of the PWM output counter member 5 increases by "1" at the PWM selection/decision member 4 and the address of the PWM data storage member 6 is selected by the count value of the PWM output counter member 5. The PWM data stored at the location of the address are read by the PWM selection/decision member 4 and outputted through the PWM output member 7. The process mentioned above is performed repeatedly every time the sharpness key signal is inputted. The status that continues to output the lowest PWM data at the PWM selection/decision member 4 is maintained since another input of the sharpness-down key signal does not decrease the count value of the PWM output counter member 5 in case the PWM data outputted at the PWM selection/decision member 4 becomes lowest. Likewise, the highest PWM data continues to be outputted at the PWM selection/decision member 4 since another input of the sharpness-up key signal does not increase the count value of the PWM output counter member 5 in case the PWM data outputted at the PWM selection/decision member 4 becomes highest. As mentioned above, the PWM signal outputted from the PWM output member 7 after the surge phenomenon is eliminated through the PWM input surge elimination member 22 of the sharpness driving member 20 controls to turn the transistor Q1 of the switching member 23 on/off.

Figure 4A:
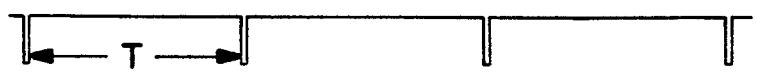
FIGS. 4A through 4D are pulse width modulation signal output waveforms of FIG. 2.
Figure 4B:
Figure 4C:
Figure 4D:
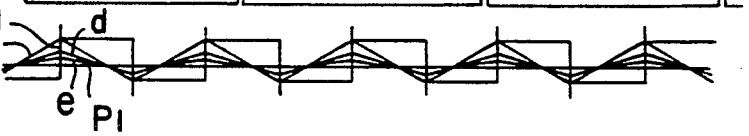

At this time, power at the power supply terminal Vcc is converted to a rated direct current source through a coil L1 by a zener diode ZD1. Ripple components of the direct current source are eliminated by ripple eliminating capacitors C1 and C2 and applied to the collector of the transistor Q1 through a resistor R1 and a diode D1. Accordingly, the signals of waveform (c) as shown in FIG. 4D is outputted at the collector because on/off repetition of the transistor Q1 is made according as the rectangular wave signal (a) of a certain period as shown in FIG. 4D is applied to the transistor Q1 of the switching means 23 through the PWM input surge elimination means 22. At this time, spike phenomena (dotted circles) of high frequency components as shown in FIG. 4D are eliminated by a coil L2 connected to the emitter of the transistor Q1.

The output waveform signal to which the third integration is applied to the integrator 24 as shown in the waveform of FIG. 4D is outputted as a sharpness driving voltage P1 of a certain DC voltage. At this time, the waveform signal (c) to which the first integration is applied through a resistor R2 and a capacitor C4 is converted to the level (d), converted to the level (e) after the second integration through a resistor R3 and a capacitor C5, and outputted as a sharpness driving voltage P1 of a certain DC voltage after the third integration through a resistor R4 and a capacitor C6. Accordingly, at this time, the level of the sharpness driving voltage P1 outputted from the integrator 24 becomes minimum (MIN) as shown in FIG. 5 since the turn-on time of the transistor Q1 grows longer and its turn-off time goes shorter in case the PWM signal of a certain period T outputted from the PWM output means 7 becomes minimum as shown in FIG. 4A. That is, the high potential section becomes longer and the low potential section becomes shorter during a certain period T. The level of the sharpness driving voltage P1 outputted from the integrator 24 becomes intermediate (CEN) as shown in FIG. 5 since the turn-on time and the turn-off time of the transistor Q1 are substantially the same in case the PWM signal of a certain period T outputted from the PWM output means 7 is intermediate as shown in FIG. 4B. The level of the sharpness driving voltage P1 outputted from the integrator 24 becomes maximum (MAX) as shown in FIG. 5 since the turn-on time of the transistor A1 goes shorter and the turn-off time goes longer in case the PWM signal of a certain period T outputted from the PWM output member 7 is maximum as shown in FIG. 4C.

As mentioned above, application of the sharpness driving voltage P1 outputted from the sharpness driving member 20 to an emphasis integrator 32 as a control voltage enables variable emphasis of high frequency components of the video signal. At this time, the high frequency components of the video signals are emphasized as shown in FIG. 6B according to the magnitude of the sharpness driving voltage P1 by the emphasis integrator 32. The video signals as shown in FIG. 6A are outputted from the video signal input means 31.

That is, when the level of the sharpness driving voltage P1 is high, the high frequency components of the video signals are greatly emphasized in proportion to the level. When the level of the sharpness driving voltage P1 is low, the high frequency components of the video signals are slightly emphasized in proportion to the level. The high frequency component signals among the signals that the high frequency components are outputted after their emphasis passes through the high-pass filter 33 as shown in FIG. 6C. The amplitude of the components is limited through the limiter 34 as shown in FIG. 6D. The output signals of the limiter 34 are applied to the mixer 35 and mixed with the video signals as shown in FIG. 6A. The mixed signals are applied to the clamp means 36 for clamping to a certain level as shown in FIG. 6E. Thus, the sharpness of screen is controlled. Consequently, the sharpness of the video signals is to be controlled by performing a variable emphasis on the high frequency components of the video signals at the emphasis integrator 32 according to the levels of the sharpness driving voltage P1 outputted from the integrator 24.

Accordingly, the present invention has the effects that provide the users with better convenience because pressing of the sharpness up/down keys on the remote controller performs a variable emphasis on the high frequency components of the video signals and makes an automatic sharpness control.

The present invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A sharpness up/down circuit for a video cassette tape recorder controlled by a remote controller, comprising:
    a remote controller for generating remote control signals such as sharpness up/down key signals;
    a microcomputer for counting a number of times said sharpness up/down key signals are received from said remote controller and for selecting and outputting a pulse width modulation signal according to the number of times counted;
    sharpness driving means for converting said pulse width modulation signal outputted from said microcomputer to a direct current voltage through switching operations and for outputting said pulse width modulation signal as a sharpness driving voltage; and
    screen control means for controlling sharpness of the video cassette tape recorder by varying emphasis on high frequency components of video signals according to a magnitude of said sharpness driving voltage outputted from said sharpness driving means.

2. The sharpness up/down circuit as claimed in claim 1, wherein said sharpness driving means comprises:
    power supply means for supplying a rated direct current source drawn out from a direct current source with ripple components eliminated;
    pulse width modulation signal surge elimination means for eliminating surge phenomena from said pulse width modulation signal outputted from said microcomputer;
    switching means for controlling an output of said power supply means according to said pulse width modulation signal through said pulse width modulation signal surge elimination means; and
    an integrator for outputting said output of said power supply means after an integration is performed on a sharpness driving voltage.

3. The sharpness up/down circuit as claimed in claim 1, wherein said screen control means comprises:
    an emphasis integrator for performing a variable emphasis on high frequency components of video signals according to said sharpness driving voltage outputted from said sharpness driving means;
    high-pass filter for passing only high frequency signals of the output signals of said emphasis integrator therethrough;
    a limiter for limiting an amplitude of signals outputted from said high-pass filter;
    a mixer for mixing output signals of said limiter with inputted video signals; and
    clamp means for setting an output signal level of said mixer to a certain level.

4. A method for controlling a sharpness up/down for a video cassette tape recorder by a remote controller, comprising the steps of:
    (a) setting a count value for an output pulse width modulation counter as a sharpness center value when power is supplied;
    (b) selecting an address of a pulse width modulation data storage unit according to the count value of the output pulse width modulation counter in a playback mode;
    (c) reading pulse width modulation data stored at the address and outputting the data to the output pulse width modulation counter;
    (d) increasing or decreasing the count value of the output pulse width modulation counter by one until the count value of the output pulse width modulation counter reaches a highest or lowest level when a sharpness-up or a sharpness-down key signal is inputted; and
    (e) selecting the pulse width modulation data and outputting the data according to the count value.

* * * * *